(12) United States Patent
Mottram

(10) Patent No.: US 10,614,392 B1
(45) Date of Patent: Apr. 7, 2020

(54) GRAPHICAL FLIGHT DASHBOARD DISPLAY AND METHOD

(71) Applicant: ROCKWELL COLLINS, INC., Cedar Rapids, IA (US)

(72) Inventor: Adam Mottram, Dorking (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 476 days.

(21) Appl. No.: 15/070,793

(22) Filed: Mar. 15, 2016

(51) Int. Cl.
  *G06Q 10/06* (2012.01)
  *G06Q 10/08* (2012.01)
  *G06Q 10/10* (2012.01)
  *G06F 3/0484* (2013.01)
  *G06F 3/0481* (2013.01)

(52) U.S. Cl.
  CPC ..... *G06Q 10/06312* (2013.01); *G06F 3/0481* (2013.01); *G06F 3/04842* (2013.01)

(58) Field of Classification Search
  CPC ........ G06Q 10/06; G06Q 10/10; G06Q 10/08; G06F 16/28; G08G 5/001
  USPC ....................................................... 705/7.22
  See application file for complete search history.

(56) References Cited

U.S. PATENT DOCUMENTS

| | | | | |
|---|---|---|---|---|
| 5,922,040 A * | 7/1999 | Prabhakaran | .......... | G08G 1/127 340/990 |
| 9,305,407 B1 * | 4/2016 | Walton | ..................... | G07C 5/02 |
| 9,367,872 B1 * | 6/2016 | Visbal | .................... | G06F 16/287 |
| 9,454,785 B1 * | 9/2016 | Hunter | .................... | G06F 16/285 |
| 9,697,736 B2 * | 7/2017 | Dunsky | .................... | G08G 5/00 |
| 2004/0044597 A1 * | 3/2004 | McLachlan | .......... | G06Q 10/087 705/28 |
| 2005/0222933 A1 * | 10/2005 | Wesby | ................... | G06Q 40/00 705/36 R |
| 2006/0187026 A1 * | 8/2006 | Kochis | ................... | G06Q 10/08 340/539.13 |
| 2007/0094548 A1 * | 4/2007 | Lev-Ami | ........... | G05B 19/4186 714/47.2 |
| 2008/0046167 A1 * | 2/2008 | Small | ..................... | G06Q 10/00 701/120 |
| 2008/0086509 A1 * | 4/2008 | Wallace | ................. | G06Q 10/10 |
| 2010/0042445 A1 * | 2/2010 | Nicosia | .......... | G06Q 10/063114 705/7.15 |
| 2012/0203589 A1 * | 8/2012 | Eggena | .................. | G06Q 10/06 705/7.15 |
| 2013/0030873 A1 * | 1/2013 | Davidson | ............... | G06Q 10/06 705/7.36 |

(Continued)

*Primary Examiner* — Nga B Nguyen
(74) *Attorney, Agent, or Firm* — Suiter Swantz pc llo

(57) ABSTRACT

A system and method are provided for providing user-configurable aircraft status displays by which aircraft fleet operations and maintenance personnel may be easily able to monitor the operational fleets under their control to quickly determine a flight status of a particular asset based on a condition represented by one or more displayed attributes. A particular display scheme is provided by which individual users can configure those elements of all source data that they may choose to track in a format that allows for ready identification of a status of any of the particular elements or attributes under observation. A "dashboard-type" display of individual aircraft, and elements of data regarding those individual aircraft, for particular attributes to be monitored by the individual user from available messaging regarding aircraft and aircraft system status.

16 Claims, 5 Drawing Sheets

(56) References Cited

U.S. PATENT DOCUMENTS

| | | | |
|---|---|---|---|
| 2013/0085625 A1* | 4/2013 | Wolfe | G06F 17/00 |
| | | | 701/1 |
| 2014/0357295 A1* | 12/2014 | Skomra | H04W 4/02 |
| | | | 455/456.1 |
| 2015/0051941 A1* | 2/2015 | Bell | G06Q 10/06313 |
| | | | 705/7.25 |
| 2015/0248795 A1* | 9/2015 | Davidson | G01C 21/34 |
| | | | 701/1 |
| 2015/0278759 A1* | 10/2015 | Harris | G06Q 10/08355 |
| | | | 705/338 |
| 2016/0093217 A1* | 3/2016 | Hale | G08G 5/0026 |
| | | | 701/120 |
| 2017/0235796 A1* | 8/2017 | Vali | G06N 5/046 |
| | | | 706/11 |
| 2018/0155052 A1* | 6/2018 | Lacroix | G08G 5/0013 |

\* cited by examiner

GRAPHICAL FLIGHT DASHBOARD DISPLAY AND METHOD

BACKGROUND

The inventive concepts disclosed herein relate to systems and methods for providing user-configurable aircraft status displays by which aircraft fleet operations and maintenance personnel may be easily able to monitor the operational fleets under their control to quickly determine a flight status of a particular asset based on a condition represented by one or more displayed attributes.

Air travel worldwide continues to be a preferred mode of transport for business travelers, and for those traveling for pleasure and/or convenience. Air transport has also become a main artery by which to support ever-increasing tonnage of bulk cargo transport responding to scheduled and on-demand requirements. Airlines, other commercial passenger air carriers, and commercial air freight carriers all operate according to fairly rigid operating schedules in order that the facilities (including terminals) and infrastructure (including the air traffic control structure) that support regional, national and global air transport do not become overburdened, even in the most densely populated areas and along the along the most densely traveled air routes. The system that ensures a constant flow of passengers and freight between destinations, including meeting intermediate connections according to an organized process, is at once fairly robust, and yet fairly inflexible in its ability to deal with disruption.

For those aspects of their operations over which the air carriers may exercise control, it is in their best interest from a business perspective, including for passenger and/or customer satisfaction, to provide what operational flexibility they can in order to be able to react to such controllable factors as equipment non-availability due to malfunctions, and aircrew non-availability due to delays and other human factors. In the increasingly competitive market for an increasing share of the overall passenger miles (or cargo miles) traveled every year, it is generally the airline, or other air carrier, that can minimize an effect of any disruptions on its schedule that will prevail.

A capacity to account for all potential disruptions must be balanced, however, with any particular air carrier's need to operate its overall business structure most efficiently. In this regard, the air carrier's decisions regarding providing spare equipment and additional aircrew at different terminals throughout its network of supported air routes must be well-informed and appropriate. There is limited flexibility to provide redundancy in a cost-effective manner.

The requirement to be responsive to all contingencies in equipment and/or personnel failures that lead to delays and other disruptions in service, present a significant challenge. In the face of such a challenge, air carriers increasingly rely on technology to provide alerts in communications regarding potential delays, as well as reasons for those delays. Early identification and recognition of some circumstance, or set of circumstances, that may ultimately lead to disruption of a single flight, which generally cascades in its effect on multiple connecting flights, or that may disrupt operations at a particular terminal, becomes of increasing importance. The earlier that a particular air carrier's operations or maintenance divisions may be alerted to the presence of some difficulty may allow for the air carrier to more quickly respond to the occurrence in order ultimately to avoid, or at least mitigate, the schedule disruption. Additional or substitute equipment (aircraft) may be placed in service and/or re-located more quickly, and spare or substitute aircrew may be more quickly contacted in order to respond.

According to the above, air carriers are increasingly interested in obtaining and optimizing real-time access to information regarding a status of the aircraft in their fleet, or at least a subset of the aircraft in their fleet for a particular regional area, geographic location, and/or air terminal facility, even while still airborne. In like manner, air terminal facilities and other air carrier support entities benefit from increased access to such information as well. The air carriers believe that increasing their access to readily-available real-time aircraft status information will enhance their overall operational performance. The challenge is that the air carriers do not currently possess the real-time readily-available capacity to display high fidelity information including the necessary information by which to provide the desired real-time insight into certain attributes that the individual air carriers, or departments within the individual air carriers, may want to particularly track in support of the overall information exchange objectives.

SUMMARY

It would be advantageous in view of the above to develop schemes by which to expand the integration of select elements of all source data into an easily-readable and user-configurable display by which air carrier operational and maintenance personnel may be more easily able to monitor particular attributes of the aircraft under their purview. An objective of such monitoring would be to gain increased insight into an operational status of the air carrier's fleet and specifically into a flight status of individual aircraft to identify and manage any issues that could impact their flight schedule, operational performance, cost or safety.

It may be advantageous to know, for example, whether there was any adverse flight conditions occurring while a particular aircraft is airborne and up to and including even an occurrence of a hard landing indication, that may need to be addressed. Such information may assist the maintenance division of the air carrier in focusing their efforts on determining whether a particular aircraft can be properly turned around in a specified amount of time, or otherwise whether a spare available aircraft may need to be substituted for the pending departure based on a need to take more detailed action over a protracted period of time in properly addressing a particular discrepancy arising in an aircraft after it lands.

Exemplary embodiments of the systems and methods according to the inventive concepts disclosed herein may provide a particular display scheme by which individual users can configure those elements of all source data that they may choose to track in a format that allows for ready identification of a status of any of the particular elements or attributes under observation.

Exemplary embodiments may provide a type of "Dashboard" display of individual aircraft, and elements of data regarding those individual aircraft, as the particular attributes that are monitored by the individual user from available messaging regarding aircraft and aircraft system status.

Exemplary embodiments may access available operational messaging generated and exchanged by one or more of the air carriers and the air terminal facilities to capture and convert individual elements of the available data into a standardized (including XML) format.

In embodiments, the disclosed schemes may "tag" or otherwise identify certain elements of information, or attributes, within data messages with an identifier to be associated with those elements of information or attributes once stored in a database.

Exemplary embodiments may reference stored databases of attribute information to easily retrieve particular relevant information for presentation in a Flight Dashboard display scheme according to a Flight Dashboard application.

In embodiments, the Flight Dashboard display scheme may be in a form of a web interface graphical representation of the flight status of each aircraft.

Exemplary embodiments may provide a Flight Dashboard display on a graphical user interface (GUI). In embodiments, user interaction with the GUI may provide an individual user with an ability to essentially drill down to determine additional information regarding any selected attribute by clicking on an easily-recognizable icon associated with that attribute.

Exemplary embodiments may provide a drop-down that includes particular icons for readily-available visual display regarding any particularly-selected attribute. For example, an open or closed icon may be provided on the Flight Dashboard display, which may be triggered to display the open icon based on the attribute information forwarded regarding a particular aircraft available aircraft status messaging information.

In embodiments, a user may choose one or more particular icons and drag-and-drop the particularly chosen icons of interest to the particular user into one or more blank fields (also referred to as blank tiles) in the Flight Dashboard display.

Exemplary embodiments may retrieve operational information from myriad sources including, but not limited to, Aircraft Communications Addressing and Reporting System (ACARS) messages, including Out, Off, On, In (OOOI) message data, and other aircraft operating system status, aircraft operational and aircraft performance message data, and assign attributes to individual elements of that data for display of the assigned attributes according to a particular user's desires.

In embodiments, each individual user may drag particular icons onto their Flight Dashboard for display according to Rules that the air carrier may have specified to be associated with each particular icon for providing either visual or message alerts with respect to particular aircraft or aircraft system status.

Exemplary embodiments may provide air carriers a capacity to monitor as many as a dozen or more separate icon-related attributes for each of their aircraft at a particular time.

Exemplary embodiments may provide a capacity for an individual user, or separately the system administrator, to provide a separate set of rules, and/or alerts, regarding parameters around those attributes for display and to specify what conditions may trigger the icons representing those attributes to change.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for providing user-configurable aircraft status display for fleet operations and maintenance personnel to easily monitor the operational fleets under their control, and to quickly determine a flight status of a particular asset based on a condition represented by one or more displayed attributes in support of managing fleet, scheduling, performance and safety issues as they arise, will be described, in detail, with reference to the following drawings, in which.

DETAILED DESCRIPTION

Figure 1:
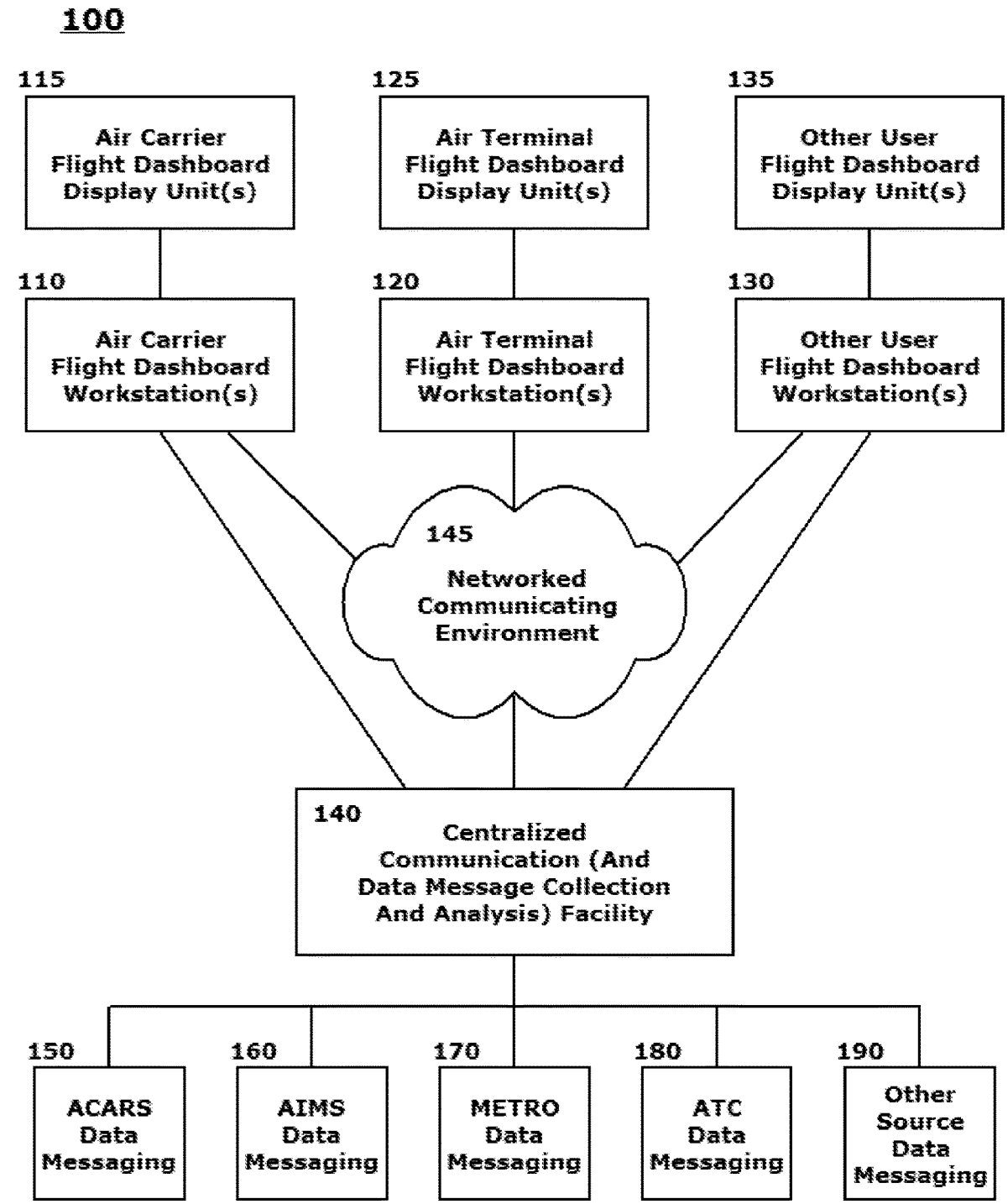
FIG. 1 illustrates an exemplary overview of an operating environment in which the Flight Dashboard operational information data display scheme according to the inventive concepts disclosed herein may be implemented.

The disclosed systems and methods for providing user-configurable aircraft status display components for aircraft fleet operations and maintenance personnel to monitor the operational fleets under their control and to quickly determine a flight status of a particular asset based on a condition represented by one or more displayed attributes in support of managing fleet, scheduling, performance and safety issues as they arise, will generally refer to these specific utilities for those systems and methods.

Exemplary embodiments will be described in this disclosure as being particularly adaptable to use for air carrier fleet and asset monitoring. An objective of such monitoring may be to provide an earliest available alert as to a particular condition of an aircraft asset that may require pre-positioning of components, or even a substitute aircraft, in order to address aircraft operating system component malfunctions or failures that may be detected in flight and which normally may not be correctable during a compressed turnaround absent operations and maintenance personnel being advised as to the occurrence of the malfunction or failure. Any particular reference, however, to such an operational employment scenario for the data collection, analysis and display schemes embodied in the inventive concepts disclosed herein is intended to be illustrative of a single particular real-world operating scenario in which the disclosed schemes may be particularly advantageously employed. Such references are not intended to be limiting in a manner that may exclude other operational scenarios, including for monitoring fleets of vehicles other than aircraft, or classes of machines that are subject to, for example, managed services contracts, that may benefit from employing dashboard-like display schemes available to operations, maintenance, technical support and other like entities and personnel. In this regard, focus on a particular operating scenario in which the systems and methods according to the inventive concepts disclosed herein may be particularly advantageously employed should be understood as being exemplary only, and not limiting the disclosed schemes, in any manner, to any particular class of users, any particular class of communications, any particular communication link or protocol, any particular class of monitored vehicle or equipment, or any particular operating scenario in which the disclosed schemes may be advantageously implemented.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

The disclosed schemes may leverage data available from individual proprietary and open-source data management systems and sources, including ACARS and Aircraft Information Management System (AIMS). The IFE Dashboard displays certain information for a particular flight in an individual "tile" as a portion of the overall display that is static in its configuration. This information includes, for example, a status of the IFE attributes as well as a flight number, a departure airport, a time of departure, a destination airport, an expected time of arrival, and other like generally readily available information regarding a particular flight.

As will be described in greater detail below, there are particularly unique differences between the disclosed Flight Dashboard schemes/systems and other conventional dashboard-like systems/display presentations as may be employed for any level of operational fleet management, including the IFE Dashboard display. The differences include the capacity of the disclosed implementations to reach additional sources of operations- and maintenance-related information in real time, or substantially real time. The differences include a capacity to provide air carriers, air terminals and other user entities with a manageable approach by which to specify the particular attributes in fleet management, on an ad hoc basis, that they desire to have tagged for potential display. The differences include flexibility for user entities, and individual users, to easily create unique dashboard displays to meet their operational monitoring and maintenance alert requirements or desires in support of performance, efficiency, and safety objectives. The disclosed schemes avoid need to have systems and displays reconfigured as operational tasking and a desire to display particular attributes and attribute conditions emerges and evolves.

The disclosed Flight Dashboard schemes may provide a capability for graphical representation and live reporting/alerting that is comparatively easily identifiable to the operational and maintenance staff personnel tasked with potentially responding to the information provided. These schemes may provide most current information in a form in which a first level analysis has been completed to allow users to further analyze and act on the information presented facilitating an informed decision-making process that is intended to optimize fleet performance both in the short term based on an immediate response to the displayed data, and in the long term as the information displayed and the responses thereto are archived for later analysis.

Air carriers may prefer to monitor such attributes as whether, for a particular aircraft on the tarmac, a fuel truck is plugged in and fueling, whether and when the refueling evolution is completed, whether or not the cargo and/or passenger cabin doors are closed, and the like. In this regard, the air carriers are able to articulate the particular attribute that they desire to track. Information attributes for, for example even only a turnaround phase may include determining when an aircraft touches down on landing, when the aircraft is taxied to the terminal and is on the chocks, opening of passenger and cargo doors, commencement and completion of the refueling evolution, closing of passenger and cargo doors, when the aircraft is pushed away from the terminal (off the chocks) and when the aircraft is ultimately airborne with an estimate of its arrival at a next destination. A difficulty addressed by inventive concepts disclosed herein is the desire of the individual air carriers, and even of individual departments and operators within the air carrier structure, to select which attributes they particularly want to monitor, and to provide a most efficient manner by which to monitor those selected attributes.

The air carriers may be given a capacity to more closely monitor an on-ground turnaround evolution for a particular aircraft to better determine whether a particular turnaround is on schedule, or otherwise being carried out in a particularly-specified amount of time. Given the often time-critical nature of such turnarounds, insight into how a particular turnaround is progressing, and any abnormalities that need to be addressed, may provide the air carrier with a capacity to optimize its resources and increase its efficiency.

Available attribute information will be useful, in different ways, to air carrier operations personnel and air carrier maintenance personnel. Those familiar with air carrier operations understand that the focus of the operations personnel and the focus of the maintenance personnel vary greatly. The maintenance are interested in discerning issues arising with the aircraft that may require additional scrutiny during, for example, a particular turnaround evolution, and/or that may require an early call regarding whether an identified difficulty requires additional time to address that may give rise to a schedule delay. Such circumstances may necessitate substituting an available spare aircraft to meet operational requirements according to the specified schedule.

To support their efforts in this regard, particularly the maintenance personnel may gain insight into certain in-flight attributes in order to monitor the performance of aircraft flight-critical systems. It may be important to monitor, for a specific phase of flight, whether the aircraft is "on time." Such insight may assist the maintenance personnel with appropriate turnaround planning leading to more efficient use of available resources, and better overall fleet schedule performance.

FIG. 1 illustrates an exemplary overview of an operating environment 100 in which the Flight Dashboard operational information data display scheme according to the inventive concepts disclosed herein may be implemented. As shown in FIG. 1, the exemplary operating environment 100 may encompass myriad lines of communication between a number of components and communicating and display nodes.

A centralized communication (and data message collection and analysis) facility 110 may communicate with a number of individual Flight Dashboard display workstations 110,120,130, each respectively associated with one or more display units 115,125,135. Individual ones of the Flight Dashboard workstations 110,120,130 may be controlled and/or operated by differing entities including: air carriers operating air carrier Flight Dashboard Workstation(s) 110, and one or more associated air carrier Flight Dashboard display unit(s) 115; air terminal control entities operating air terminal Flight Dashboard Workstation(s) 120 and one or more associated air terminal Flight Dashboard display unit(s) 125; and other users operating other user Flight Dashboard Workstation(s) 130 and one or more associated other user Flight Dashboard display unit(s) 135. Communications between the Flight Dashboard Workstation(s) 110,120,130 and the centralized facility 110 may be direct wired or wireless communications, or may be via a networked communicating environment 145 to which some or all of the communicating nodes are connected.

Separately, either directly, or through a same or different networked communicating environment, the centralized communication facility 140 may gain access to data messaging from myriad data sources 150-190. A non-exhaustive list of available data sources may include ACARS data messaging 150, AIMS data messaging 160, meteorological (Metro) data messaging 170, air traffic control (ATC) data messaging 180, and select other source data messaging 190. It will be from these myriad sources for data messaging 150-190 that aircraft operating information associated with certain monitored attributes may be collected and stored in a database.

The centralized communication facility 140 may act as a clearinghouse by which all of the data that may be appropriate to support a particular menu list of individual attribute items may be parsed from, for example, the available data messaging sources 150-190 in order that tracking of individual attributes may be provided. In embodiments, virtually all of the computing overhead for parsing the myriad messages from a particular aircraft, or fleet of aircraft, may be undertaken at the centralized communication facility 140 in order that targeted data may be provided, on request, to populate particular attribute information on individual Flight Dashboard display devices.

The centralized communication facility 140 has the capacity to extract specific attribute information from the volume of message traffic received from any particular aircraft and to provide it in a targeted message platform for display.

Figure 2:
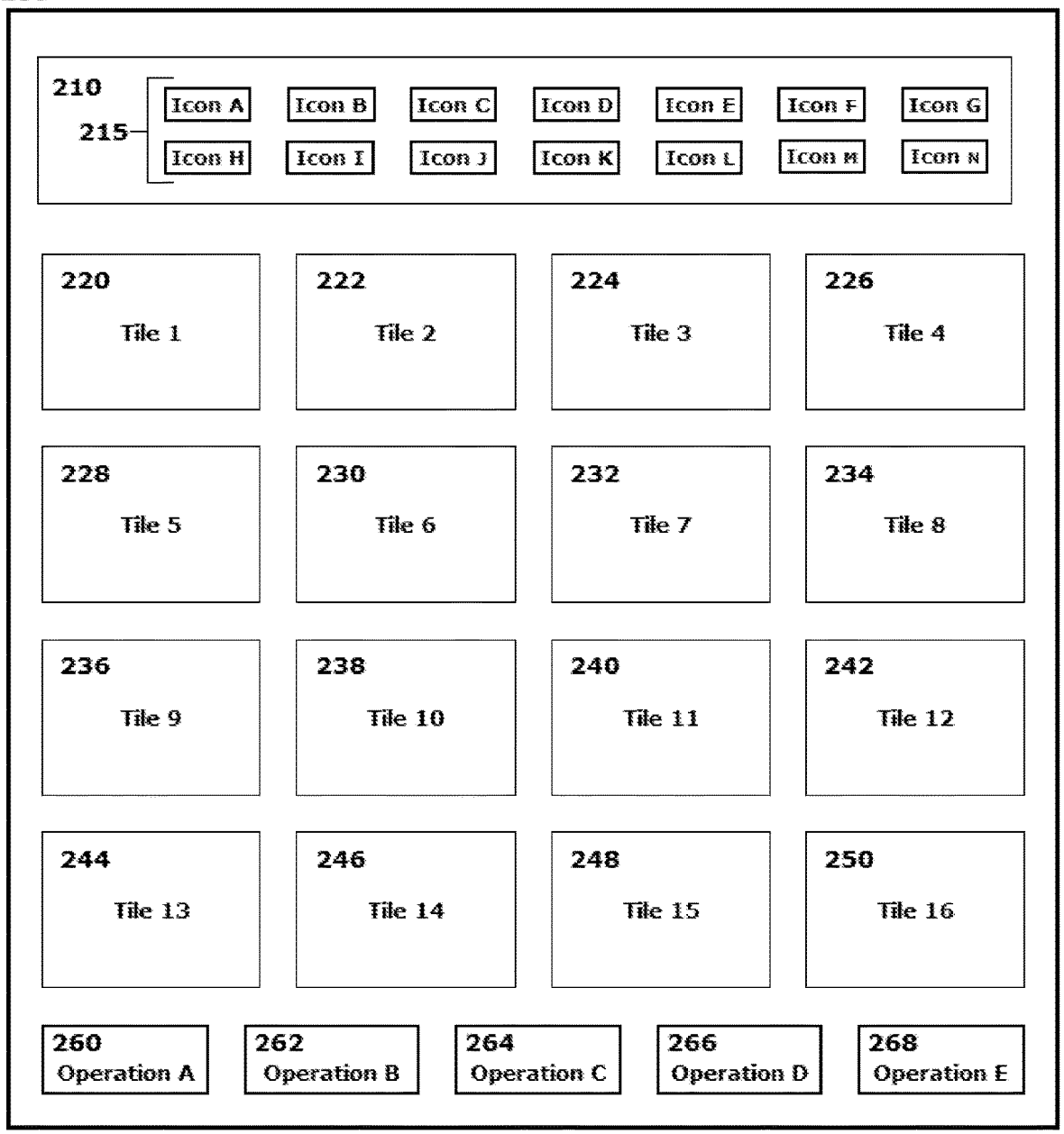
FIG. 2 illustrates an exemplary embodiment of a Flight Dashboard display for operational information according to the inventive concepts disclosed herein.

FIG. 2 illustrates an exemplary embodiment of a Flight Dashboard display 200 for operational information according to the inventive concepts disclosed herein.

A main portion of the exemplary Flight Dashboard display 200 may be divided into any number of individual information fields, which may be presented in a form of tiles (tile 1-16) 220-250. Each information field or tile 220-250 may contain multiple attributes regarding a particular aircraft arriving at, or departing from, a particular location. The disclosed Flight Dashboard scheme may provide a dashboard-type display that provides a plurality of blank tiles 220-250 to be easily configurable by a particular user according to that user's needs or desires.

The exemplary Flight Dashboard display 200 may include a drop-down menu 210 for displaying a number of user-selectable icons (Icon A-Icon N) 215. The drop-down menu 210 may, for example, include particular icons 215 that provide readily-available visual display regarding any particularly-selected attribute in the manner described above. For example, an open or closed icon may be provided on the Flight Dashboard display 200 and may be triggered to display the open icon based on the attribute information forwarded regarding a particular aircraft passenger door or cargo hold door from a centralized communication facility.

The user may choose one or more particular icons 215 and drag-and-drop the particularly chosen icons 215 of interest into one or more of the blank tiles 220-225 in the Flight Dashboard display 200. In this manner, a display may be provided by which to easily monitor each of a particular set of specified attributes that would afford user personnel an opportunity to monitor whatever part of a particular operation they may choose.

In embodiments, as shown in FIG. 2, a series of operation buttons (for Operation A-E) 260-268 may be provided on the Flight Dashboard display 200. Each of these operation buttons 260-268 may be provided to execute particular operations with regard to the Flight Dashboard display 200. Each of these operation buttons 260-268 may be, for example, usable to modify a display scheme of the Flight Dashboard display 200 for brightness, contrast, or according to a particular color scheme that the user may choose. Separately, one or more of the operation buttons 260-268 may be usable to communicate with the central communication facility to provide, for example, a query or an acknowledgment regarding particular information displayed in one or more of the tiles 220-250.

Figure 3:
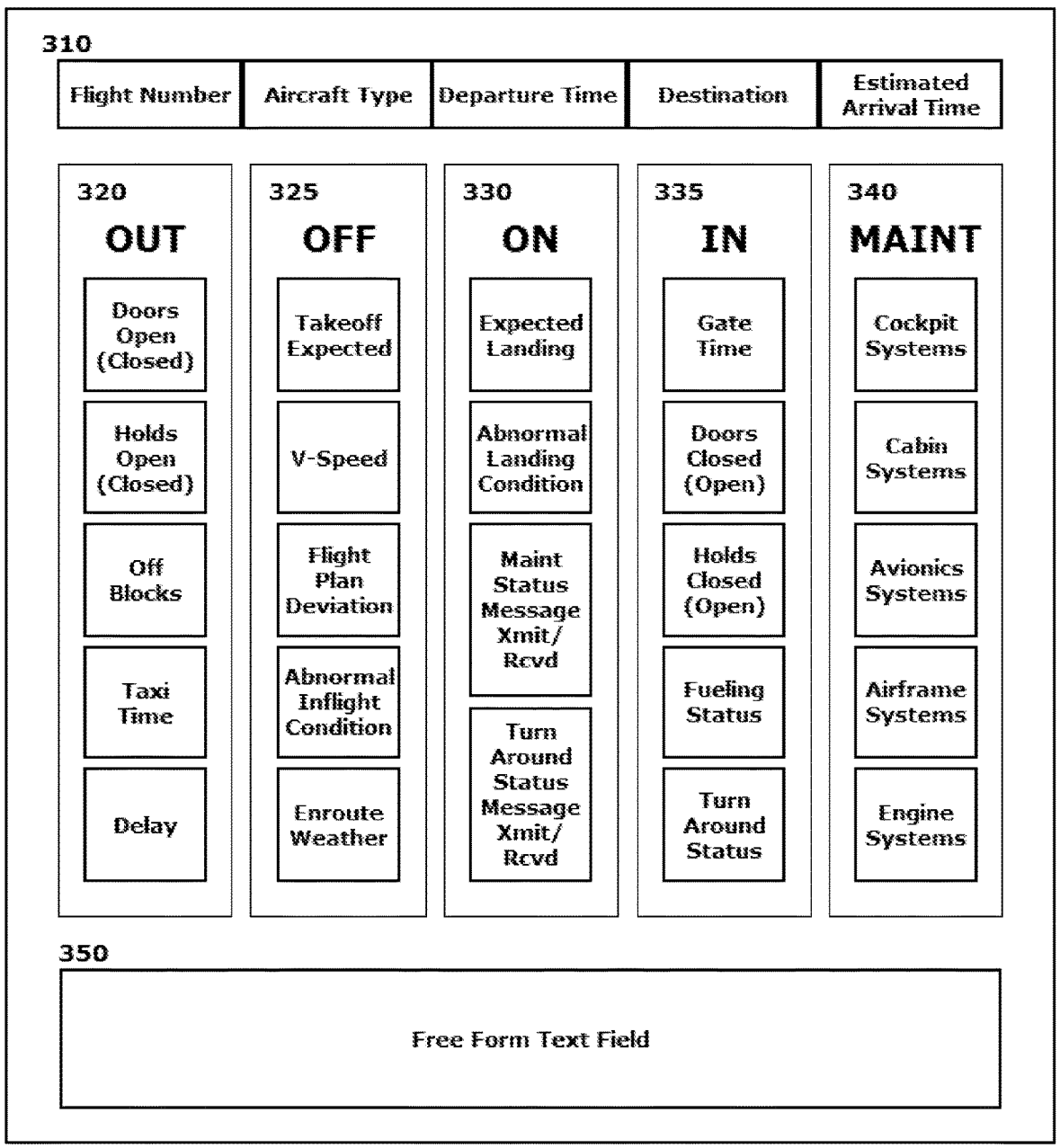
FIG. 3 illustrates an exemplary embodiment of an individual data field, or tile, in a Flight Dashboard display for operational information according to the inventive concepts disclosed herein.

FIG. 3 illustrates an exemplary embodiment of an individual data field 300, or tile, in a Flight Dashboard display for operational information according to the inventive concepts disclosed herein. As shown in FIG. 3, the individual data field 300 may include an administrative data field 310 providing user-fillable sub-fields for identifying information regarding the particular aircraft to which the information in the individual data field 300 may be directed. This information may include, as depicted, a flight number, an aircraft type, a departure time, a destination, and an estimated time of arrival at the destination. The available information for populating an administrative data field 310 is, however, not limited to that depicted in the example shown in FIG. 3.

The individual data field 300 may be divided into sections 320-335 for particular phases of flight according to, for example, a standard ACARS reporting scheme for Out, Off, On and In (OOOI) for familiarity and ease of interpretation by those familiar with standard aircraft operations and ACARS reporting schemes. An additional section 340 may be added for specifically tracking individual maintenance issues, failures or concerns that may arise based on information parsed from available messaging. Each of the sections 320-340 depicted in FIG. 3 includes a plurality of exemplary icons.

The disclosed schemes would allow the displays to be adapted for particular air carriers, particular air terminals, particular handling agents/agencies, and the like. In embodiments, easy to follow alert information may be provided in an effort to develop a reasonably easily discernible picture, almost at a glance, to determine a status of any particular aircraft, or group of aircraft.

In embodiments, a standard matrix may be provided, by which, for example, a dispatcher may be able to look at the display and determine the presence of some malfunction, or even some operational deviation that does not rise to the level of a malfunction.

In embodiments, the Flight Dashboard display may provide an intuitive alert scheme including, for example, a color keyed display to show green for systems working as intended, yellow as an alert to a particular deviation having been detected and red for a critical system malfunction, or the like, which needs to be addressed as soon as possible. It should be noted that, as used in this disclosure, the term icon is not intended to be limiting in any manner. Rather, the term icon is generally used as a shorthand to describe, in standard parlance, any manner of manipulable or modifiable graphic display indicator, which may be automated to change its appearance in response to some particular change in status of the attribute that the icon or graphical display indicator is intended to emulate. As is shown in FIG. 2, a menu of icons may be presented by which a user can individually customize each or all of the information data fields 300 or tiles the Flight Dashboard display. As noted above, the user may be able to choose the icons at the user's discretion and to drag and drop the chosen icons onto the blank tiles of the Flight Dashboard display.

Each incidence of an individual information data field 300 may be independently configurable by selecting particular icons to populate the individual information data field 300 in a first mode, or in a second mode to, for example, indicate that each of the blank tiles is to be configured identically, any difference being with respect to the particular aircraft for which the identical attributes are monitored.

The traffic light color scheme referred to above may be adopted based on its intuitiveness, and ease of implementation. Otherwise other variable color schemes may be adopted. Better and more immediate situational awareness may be provided in a single display component as a user may be able to glance at the Flight Dashboard display and easily ascertain whether all systems are "go" (green), or whether the status of one or more of the monitored systems is questionable (yellow), or the status of one or more of the monitored systems is indicated as failed (red). The Flight Dashboard display may be configurable such that in an event that any of the individually-tracked attributes has a parameter which causes it to display red, and enhanced level of alerting may be additionally presented. The entire box (tile), for example, may be flashed, separately colored or magnified. This may assist the user that has configured the display to his or her particular needs by providing an additional, intuitively readable, determination of a mission-critical difficulty or failure on one or more of the aircraft, among the multiple information data fields 300.

The disclosed Flight Dashboard display 300 may include a free-form text field 350 that may be usable to display additional textual information regarding one or more of a yellow or red tile according to the discussion above.

The depictions in FIGS. 2 and 3 are intended to capture exemplary details of the disclosed Flight Dashboard display. A graphical live status view of a particular air carrier's operation may be provided that can display an entire air carrier's fleet, or that can be filtered into groups of the air carrier's fleet for operational purposes. A central communication facility may be provided access to operational messages transmitted from, or associated with onboard systems in the individual aircraft. The data may be captured by the central communication facility, converted into a standard format (which may include standard XML format) identifying relevant attributes of the message. Attribute information may be tagged and the tagged attribute information data may be stored in a database so that it can then be easily retrieved by the Flight Dashboard application for display on the Flight Dashboard display.

Each message-based attribute may be represented as a particular graphical display indicator or icon. Display rules and conventions associated with each of the particular graphical display indicators or icons may be provided according to an administrator or other authority. These display rules may specify a reaction of an icon, e.g., in a form of a visual (Traffic light) display scheme, or may prescribe that certain message alerts should be forwarded via email or SMS. Alerts may be set for OOOI messages, hard landings, maintenance, fuel usage, and potentially weather for each stage of an aircraft movement evolution, which can also affect on-time performance. Each icon may be highlighted and provide a capability for the user to drill down to obtain the full message from which the attribute information under consideration, and as represented by the icon, may originate. The disclosed schemes thus provide a capability by which to implement immediate adverse condition monitoring of an aircraft throughout its movement evolution based on an ability to selectively read data messaging emanating from, or otherwise associated with, the particular aircraft.

Figure 4:
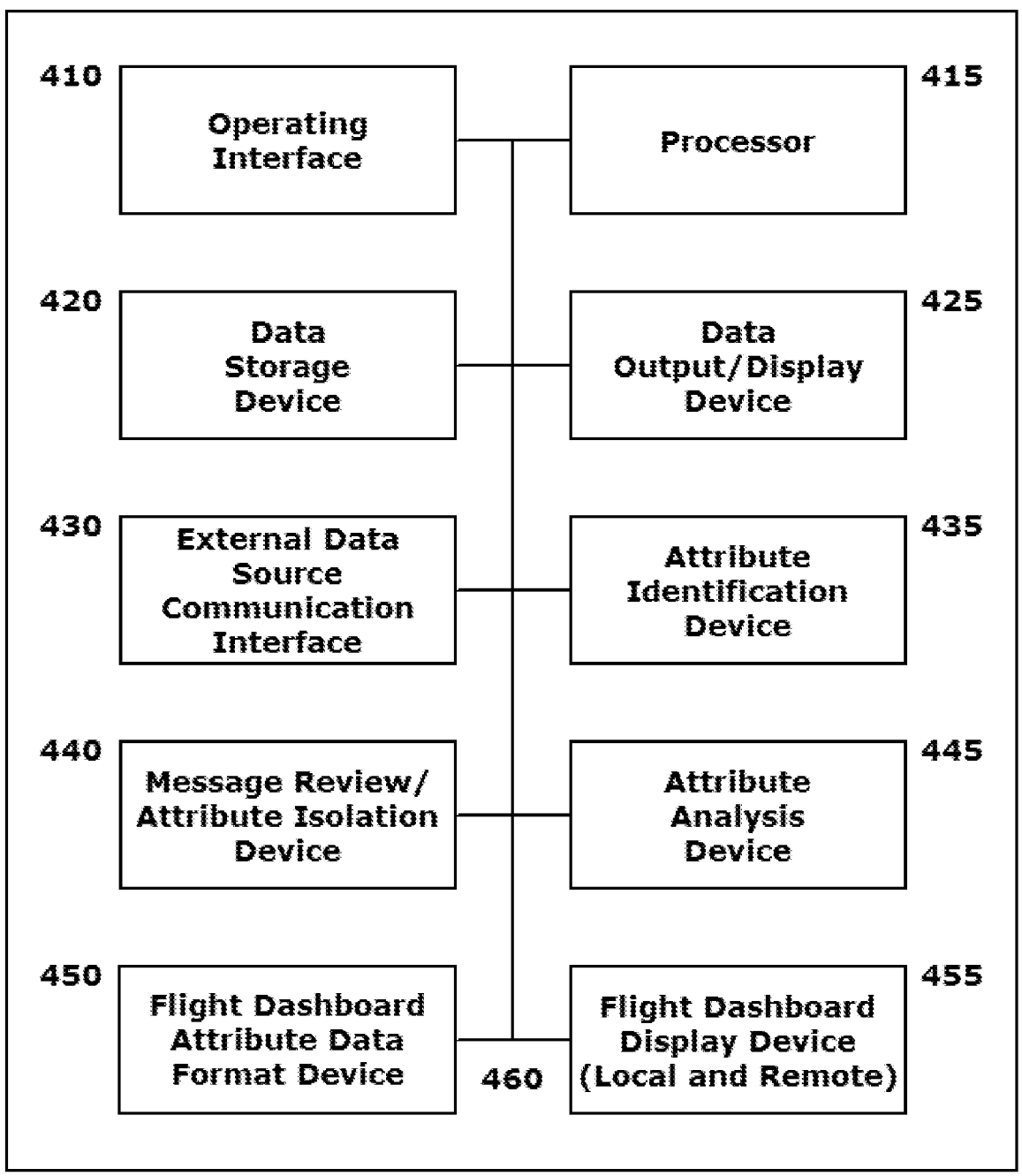
FIG. 4 illustrates an exemplary system for data communication, collection, analysis and display in which the Flight Dashboard display schemes according to the inventive concepts disclosed herein may be implemented.

FIG. 4 illustrates an exemplary system 400 for data communication, collection, analysis and display in which the Flight Dashboard display schemes according to the inventive concepts disclosed herein may be implemented.

The exemplary system 400 may include an operating interface 410 by which a user may communicate with the exemplary system 400 for directing operations of the exemplary system 400 in implementing the disclosed Flight Dashboard schemes. The user interface 410 may be usable in initiating and directing operation of one or more Flight Dashboard display devices 455, and directing communication with the variety of data sources with which the exemplary system 400 coordinates among the plurality of connected nodes (as shown generally in FIG. 1 and described in detail above). The operating interface 410 may be a part or a function of a graphical user interface (GUI) mounted on, integral to, or associated with, the exemplary system 400. The operating interface 410 may alternatively take the form of any user-interactive device by which user inputs and/or commands are input to an automated processing system including, but not limited to, a keyboard or a touchscreen, a mouse or other pointing device, a microphone for providing verbal commands, or any other operating interface device.

The exemplary system 400 may include one or more local processors 415 for carrying out the individual operations and functions of the exemplary system 400. The processor 415 may reference, for example, each attributes specified in a Flight Dashboard display scheme and parse communication with one or more data sources to identify and tag information contained in the communication and data messaging relating to the attribute. The processor 415 may direct storing of the tagged messaging information in one or more databases for reference. The processor 415 may initiate requisite queries of the respective databases to provide real-time information to change a depiction of a particular icon in one or more Flight Dashboard displays on one or more Flight Dashboard display devices 455 as appropriate to compile an indication of conditions of operation of a plurality of aircraft in a fleet.

The exemplary system 400 may include one or more data storage devices 420. Such data storage device(s) 420 may be used to store data or operating programs to be used by the exemplary system 400, and specifically the processor(s) 415 in carrying into effect the disclosed Flight Dashboard display operations and functions. Data storage device(s) 420 may be used to store information obtained from respective external data sources as it may pertain to the individual attributes under review at a particular time. The storage of such data may streamline the determination regarding changing a condition of an icon on a Flight Dashboard display based on the collected and stored attribute information. Determined discrepancy and/or deviation information associated with one or more of the attributes may be stored for immediate processing and/or for later analysis, review, and other beneficial purposes in order to provide, for example, periodic feedback to an air carrier or other aircraft control or operating entity regarding recurring discrepancies and/or deviations fleet wide.

The data storage device(s) 420 may include a random access memory (RAM) or another type of dynamic storage device that is capable of storing updatable database information, and for separately storing instructions for execution of system operations by, for example, processor(s) 415. Data storage device(s) 420 may also include a read-only memory (ROM), which may include a conventional ROM device or another type of static storage device that stores static information and instructions for processor(s) 415. Further, the data storage device(s) 420 may be integral to the exemplary system 400, or may be provided external to, and in wired or wireless communication with, the exemplary system 400, including as cloud-based storage and/or processing elements.

The exemplary system 400 may include at least one data output/display device 425, which may be configured as one or more conventional mechanisms that output information to a user, including, but not limited to, a display screen on a GUI associated with the exemplary system 400 to provide feedback to an operator of the exemplary system 400 regarding, for example, system health. One or more of the output/display devices 425 may be configured as a Flight Dashboard display device 455. Otherwise the Flight Dashboard display devices 455, whether local or remote, may be provided separately from the system control data output/display devices 425.

The exemplary system 400 may include at least one external data source communication interface 430. Each interface 430 may be particularly configured to coordinate communications between the exemplary system 400 and each of the available data sources that may be referenced for compiling attribute information from, for example, available data messaging regarding operation for a particular aircraft, or group of aircraft. Individual interfaces 430 may communicate with data exchange and monitoring components within an aircraft in order to provide inputs that may allow the exemplary system 400 integrate all available information appropriate to characterizing the condition of a particular attribute for a particular aircraft. As indicated above, the disclosed Flight Dashboard display schemes may be implemented by the exemplary system 400 assimilating all available data messaging information from multiple data sources to determine attribute-related information in a real-time or near-real-time for processing and display generally as a condition change to one or more icons displayed on a Flight Dashboard display device 455.

The exemplary system 400 may include at least one attribute identification device 435. The attribute identification device 435 may reference a series of user-selected icons displayed on one or more of the Flight Dashboard display devices 455 to determine which particular attributes may be of interest to the user of the exemplary system 400. The attribute identification device 435 may be a standalone device in the exemplary system 400, or may be a function of one or more processors 415 in the exemplary system 400.

The exemplary system 400 may include a message review/attribute isolation device 440. The message review/attribute isolation device 440 may operate to review available data messaging from a particular aircraft or multiple aircraft and isolate individual attribute information to be tagged and stored in a database for further analysis and processing according to the disclosed Flight Dashboard display schemes in the manner described above. The message review/attribute isolation device 440 may be a standalone device in the exemplary system 400, or may be a function of one or more processors 415 in the exemplary system 400.

The exemplary system 400 may include an attribute analysis device 445. The attribute analysis device 445 may be usable to translate information from the various data messaging sources into a common format, which may be an XML format, in order to facilitate the parsing scheme by which the attribute information may be analyzed for presentation on the one or more Flight Dashboard display devices 455. As with others of the components listed above, the attribute analysis device 445 may be a standalone device in the exemplary system 400, or may be a function of one or more processors 415 in the exemplary system 400.

The exemplary system 400 may include a Flight Dashboard attribute data format device 450. The attribute data format device 450 may be usable to provide a scheme by which to format an icon presentation of a particular attribute according to a set of rules that may be established by a user and associated with each icon. Attribute information may, for example, trigger a change in color or other presentation of an icon on the Flight Dashboard display device 455. The rules associated with each of the icon presentations may be, for example, received initially via the operating interface 410 and stored in one or more data storage devices 420 for reference by the attribute data format device 450. The attribute data format device 450 may be a standalone device within the exemplary system 400, or may be a function of one or more processors 415 in the exemplary system 400.

The attribute identification device 435, the message review/attribute isolation device 440, the attribute analysis device 445, and the attribute data format device 450 may work in concert with one another to identify attribute-related information that may, according to the stored rules, necessitate a change in a display of a particular icon on the Flight Dashboard display device 455.

All of the various components of the exemplary system 400, as depicted in FIG. 4, may be connected internally, and potentially to remote data storage and processing facilities or components, by one or more data communication and/or control busses 460. These data communication and/or control busses 460 may provide wired or wireless communication between the various components of the exemplary system 400, whether all of those components are housed integrally in, or are otherwise external and connected to, other components of an overarching aircraft communication and control system for carrying into effect the disclosed Flight Dashboard display schemes.

It should be appreciated that, although depicted in FIG. 4 as an essentially integral unit, the various disclosed elements of the exemplary system 400 may be arranged in any combination of sub-systems as individual components or combinations of components, integral to a single unit, or external to, and in wired or wireless communication with, the single unit of the exemplary system 400. In other words, no specific configuration as an integral unit or as a support unit is to be implied by the depiction in FIG. 4. Further, although depicted as individual devices/units for ease of understanding of the details provided in this disclosure regarding the exemplary system 400, it should be understood that the described functions of any of the individually-depicted components may be undertaken, for example, by one or more processors 415 connected to, and in communication with, one or more data storage device(s) 420, all of which may support implementation of the disclosed Flight Dashboard display schemes.

Figure 5:
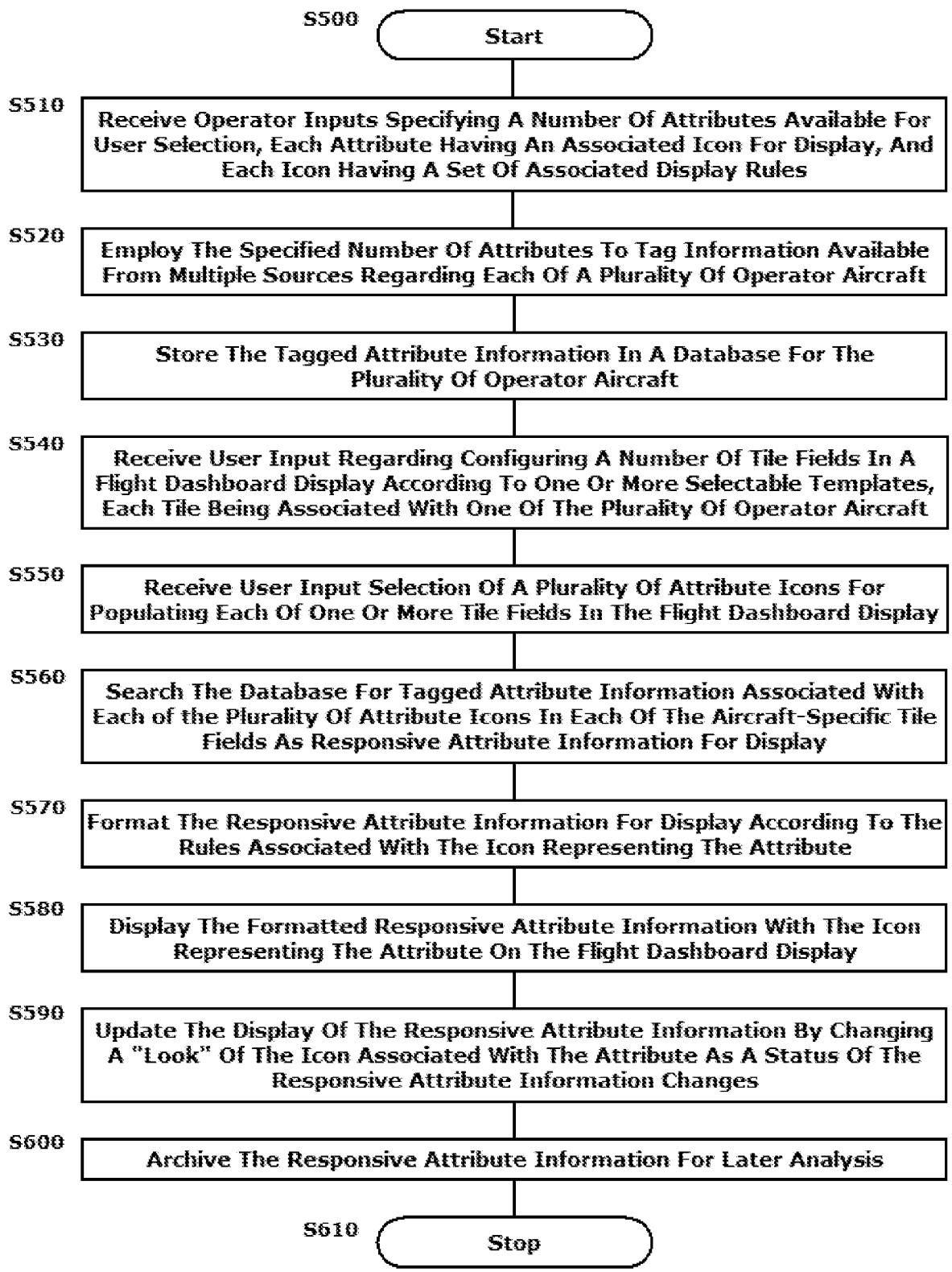
FIG. 5 illustrates a flowchart of an exemplary method for implementing a Flight Dashboard display scheme according to the inventive concepts disclosed herein.

The disclosed embodiments may include an exemplary method for implementing a Flight Dashboard display scheme. FIG. 5 illustrates an exemplary flowchart of such a method. As shown in FIG. 5, operation of the method commences at Step S500 and proceeds to Step S510.

In Step S510, operator and puts specifying a number of attributes available for user selection may be received. Each attribute may have an associated icon usable for display in the Flight Dashboard display. The operator may provide a set of display rules for each icon in order that the icon may change in its display characteristics based on a status of the attribute information. Operation of the method proceeds to Step S520.

In Step S520, the specified number of attributes may be employed to tag information available from multiple sources, including multiple data messaging sources regarding operation of, and system performance in, one or more aircraft overseen by the operator. The tagged information may specify a condition of a particular aircraft or aircraft system specified by the attribute. Operation of the method proceeds to Step S530.

In Step S530, the tagged attribute information may be stored in a database for the plurality of operator aircraft. Operation of the method proceeds to Step S540.

In Step S540, user input may be received via a user-interface regarding configuring a number of tile fields in a Flight Dashboard display. Standard configurations for the Flight Dashboard display may be selectable from, for example, a range of one or more selectable templates. Each of the number of tile fields in the Flight Dashboard display may be associated with a single one of the plurality of operator aircraft, the data messaging of which is collected according to the specified attribute information sought. Operation of the method proceeds to Step S550.

In Step S550, additional user input may be received via the user interface regarding selection of a plurality of attribute icons for populating each of the one or more tile fields in the Flight Dashboard display. As noted above, each of the tile fields may be separately configured according to a user's desires, or all of the tile fields in a particular user's Flight Dashboard display may be similarly, or identically, configured at the user's discretion. Operation of the method proceeds to Step S560.

In Step S560, the database may be searched for tag attribute information associated with each of the plurality of attribute icons in each of the aircraft-specific tile fields to collect responsive attribute information for display in a modification of the actual display of a particular icon associated with the attribute information. Operation of the method proceeds to Step S570.

In Step S570, the responsive attribute information may be formatted for display according to the operator input roles associated with the icon representing the attribute. Operation of the method proceeds to Step S580.

In Step S580, the formatted responsive attribute information may be displayed by changing a condition of the icon representing the attribute on the Flight Dashboard display. In embodiments in which the Flight Dashboard display may include a free-form text field, certain additional information may be parsed and presented in the free-form text field explaining further a basis for a change in indication of a particular attribute icon on the Flight Dashboard display. Operation of the method proceeds to Step S590.

In Step S590, in an iterative process, responsive attribute information will continue to be tracked and updated as appropriate. As the responsive attribute information changes, the condition of the icon on the Flight Dashboard display may be changed to represent a current status of the attribute information associated with that icon. Operation of the method proceeds to Step S600.

In Step S600, the responsive attribute information may be archived for later analysis to any beneficial purpose including, but not limited to, assessing an overall discrepancy status of a particular aircraft or fleet of aircraft to identify recurring difficulties associated with the particular aircraft or fleet of aircraft that may be separately addressable by the operator in order to reduce instances of such discrepancies an increase overall efficiency in the operation of the operator's fleet of aircraft. Operation of the method proceeds to Step S610, where operation of the method ceases.

The disclosed embodiments may include a non-transitory computer-readable medium storing instructions which, when executed by a processor, may cause the processor to execute all, or at least some, of the functions that may be appropriate to implementing the steps of the method outlined above.

The above-described exemplary systems and methods reference certain conventional communicating and/or computing components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions, including cloud-based applications, to carry out the specific functions described. These may include individual program modules executed by one or more processors. Generally, program modules include routine programs, objects, components, data structures, and the like that perform particular tasks or implement particular data types in support of the overall objective of the systems and methods implementing the in effective concepts disclosed herein.

Those skilled in the art will appreciate that other embodiments of the disclosed subject matter may be practiced in integrating all source data/information to derive the types of attribute information discussed above for display in a user-configurable Flight Dashboard display.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 5, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual interaction with a particular aircraft that may individually reliably employ components of the disclosed system, or carry out functions of the disclosed schemes. This enables each access unit and/or personal electronic device to enjoy the benefits of the disclosed embodiments even if any one of the large number of possible end-user nodes (including individual aircraft, or otherwise individual display components) do not need some portion of the described functionality. In other words, there may be multiple instances of the disclosed system each processing the content in various possible ways. It does not necessarily need to be one system used by all end-user nodes. Accordingly, the appended claims and their legal equivalents should only define the disclosed embodiments, rather than any specific examples given.

I claim:

1. A system for tracking a plurality of aircraft, comprising:
   a data collection device that is configured to collect data messaging from a plurality of data sources, the plurality of data sources including at least Aircraft Communications Addressing and Reporting System (ACARS) messages including out, off, on in (OOOI) messages, aircraft information management system (AIMS) messages, meteorological messages, and air traffic control messages, the data messaging relating to operation of the plurality of aircraft;
   a display device that includes a plurality of data fields for displaying tracking data for a plurality of individually-identified aircraft among the plurality of aircraft;
   a user interface that is configured to
   accept a first user input identifying one of the individually-identified aircraft in one of the plurality of data fields as a first data field associated with a first asset, and
   accept user selection of a plurality of graphical display indicators for inclusion in the first data field, each of the plurality of graphical display indicators representing an individual asset attribute to be tracked for the first asset;
   a data integration device that is configured to
   recognize the asset attributes associated with each of the selected graphical display indicators for the first asset, and
   analyze the collected data messaging to tag information associated with the asset attributes for the first asset, the tagged information being specified by a user according to desired set of parameters and a rule set;
   translate the tagged information collected from the plurality of data sources into a common format;
   parse and isolate the tagged information from the data messaging;
   store the tagged information in a data storage device; and
   a display formatting device that is configured to modify an appearance of one or more of the graphical display indicators associated with the first asset based on the tagged information associated with the asset attributes represented by the one or more graphical display indicators and send an alert via an email message or SMS message which relate to a condition which affects on-time performance of at least one of the plurality of aircraft.

2. The system of claim 1, the user interface being further configured to accept user inputs that specify a particular group of graphical display indicators among the plurality of graphical display indicators to be presented for selection in one or more drop-down menus.

3. The system of claim 2, the user interface being further configured to accept user input specifying a set of rules for the modification of the appearance of each of the graphical display indicators in the particular group of graphical display indicators based on analyzed conditions of the asset attribute represented by the each of the graphical display indicators.

4. The system of claim 3, the set of rules comprising a standard colored-coded display scheme for each of the graphical display indicators.

5. The system of claim 4, the standard colored-coded display scheme comprising a green indication for an acceptable condition of the asset attribute, a yellow condition for a degraded condition of the asset attribute and a red condition for an unacceptable or failed condition of the asset attribute.

6. The system of claim 3, the set of rules providing that at least that when an unacceptable or failed condition of an asset attribute is detected, the data field including the graphical display indicator representing that asset attribute is at least one of highlighted or magnified on the display device.

7. The system of claim 6, at least one of the graphical display indicators representing an asset attribute that is at least one of a condition of a passenger or cargo door, a status of a fueling evolution, and overall status of an aircraft turnaround, and a status of an aircraft loading in preparation for pushback from an air terminal.

8. The system of claim 6, at least one of the graphical display indicators representing a status of an aircraft cockpit system, an aircraft cabin system, an aircraft propulsion system, and an aircraft airframe system, the status of which is obtained via data messaging while the aircraft is in flight.

9. A method for tracking a plurality of aircraft, comprising:
   collecting, by a processor, data messaging from a plurality of data sources, the data relating to operation of the plurality of aircraft, the plurality of data sources including at least Aircraft Communications Addressing and Reporting System (ACARS) messages including out, off, on in (OOOI) messages, aircraft information management system (AIMS) messages, meteorological messages, and air traffic control messages;
   providing a display device that includes a plurality of data fields for displaying tracking data for a plurality of individually-identified aircraft among the plurality of aircraft;
   receiving, by the processor, user inputs that associate one of the individually-identified aircraft with one of the plurality of data fields as a first data field for monitoring a first asset;
   receiving, by the processor, user input selecting a graphical display indicator representing each asset attribute to be monitored for the for the first asset for inclusion in populating the first data field;
   recognizing, by the processor, the asset attributes associated with each of the selected graphical display indicators for the first asset;
   analyzing, by the processor, the collected data messaging to tag information associated with the asset attributes for the first asset, the tagged information being specified by a user according to desired set of parameters and a rule set;
   translating the tagged information collected from the plurality of data sources into a common format;
   parsing and isolating the tagged information from the data messaging;
   storing the tagged information in a data storage device; and
   modifying, with the processor, an appearance of one or more of the graphical display indicators associated with the first asset based on the tagged information associated with the asset attributes represented by the one or more graphical display indicators; and sending, with the processor, an alert via an email message or SMS message which relate to a condition which affects on-time performance of at least one of the plurality of aircraft.

10. The method of claim 9, the plurality of aircraft being assets controlled by an operator, the method further comprising receiving, by the processor, from the operator an input that specifies a particular group of graphical display indicators among a library of available graphical display indicators to which the user selection is limited.

11. The method of claim 10, further comprising receiving, by the processor, from the operator an input specifying a set of rules for the modification of the appearance of each of the graphical display indicators in the particular group of graphical display indicators based on analyzed conditions of the asset attribute represented by the each of the graphical display indicators.

12. The method of claim 11, the set of rules specifying a standard colored-coded display scheme for each of the graphical display indicators.

13. The method of claim 12, the standard colored-coded display scheme indicating green for an acceptable condition of the asset attribute, yellow for a degraded condition of the asset attribute and red for an unacceptable or failed condition of the asset attribute.

14. The method of claim 11, the set of rules specifying at least that when an unacceptable or failed condition of an asset attribute is detected, the data field including the graphical display indicator representing that asset attribute is at least one of highlighted or magnified on the display device.

15. The method of claim 14, at least one of the graphical display indicators representing an asset attribute that is at least one of a condition of a passenger or cargo door, a status of a fueling evolution, and overall status of an aircraft turnaround, and a status of an aircraft loading in preparation for pushback from an air terminal.

16. The method of claim 14, at least one of the graphical display indicators representing a status of an aircraft cockpit system, an aircraft cabin system, an aircraft propulsion system, and an aircraft airframe system, the status of which is obtained via data messaging while the aircraft is in flight.

* * * * *